United States Patent
Sexton et al.

(10) Patent No.: US 6,678,697 B2
(45) Date of Patent: Jan. 13, 2004

(54) MEMORY MANAGEMENT WITHIN A RUN-TIME ENVIRONMENT

(75) Inventors: Harlan Sexton, Menlo Park, CA (US);
David Unietis, Menlo Park, CA (US);
Peter Benson, Boulder, UT (US)

(73) Assignee: Oracle Corp., Redwood Shores, CA (US)

(*) Notice: Subject to any disclaimer, the term of this patent is extended or adjusted under 35 U.S.C. 154(b) by 132 days.

(21) Appl. No.: 10/102,844

(22) Filed: Mar. 22, 2002

(65) Prior Publication Data

US 2002/0194191 A1 Dec. 19, 2002

Related U.S. Application Data

(62) Division of application No. 09/248,295, filed on Feb. 11, 1999.

(51) Int. Cl.[7] ............................................. G06F 17/00
(52) U.S. Cl. ................... 707/103 R; 707/200; 707/203
(58) Field of Search ................. 709/100–332; 707/1–206

(56) References Cited

U.S. PATENT DOCUMENTS

| | | |
|---|---|---|
| 5,075,842 A | 12/1991 | Lai |
| 6,003,123 A | 12/1999 | Carter |
| 6,345,276 B1 | 2/2002 | Lee |
| 6,349,297 B1 * | 2/2002 | Shaw et al. ............... 707/4 |
| 6,449,626 B1 * | 9/2002 | Garthwaite et al. ........ 707/205 |
| 6,571,262 B2 * | 5/2003 | Garst et al. ............... 707/206 |

FOREIGN PATENT DOCUMENTS

GB 2 239 335 A 6/1991

OTHER PUBLICATIONS

Shapiro, Binding should be flexible in a distributed system, Object Orientation in Operating Systems, 1993, Proceedings of the Third International Workshop on, Dec. 9–10, 199, pp. 216–217.*

Geihs et al., Protected object references in heterogeneous distributed systems, Computers, IEEE Transactions on, vol. 42, Issue 7, Jul. 1993, pp. 809–816.*

Maisonneuve et al., Implementing references as chains of links, Object Orientation in Operating Systems, 1992, Proceedings of the Second International Workshop on, 24–25, Sep. 1992, pp. 236–243.*

Kelly E. Murray, "Under the Hood: CLOS", Journal of Object–Oriented Programming, pp. 82–86, Sep. 1996.

* cited by examiner

*Primary Examiner*—David Jung
(74) *Attorney, Agent, or Firm*—Ditthavong & Carlson, P.C.

(57) ABSTRACT

Objects that are managed within a run-time environment are stored on N-bit aligned addresses. Due to the alignment restriction, the N least significant bits of a reference to an object are available for storing information about the storage properties of the object. This information is extractable by fast register operations. The storage properties can include the lifetime, format, and contiguity of the object, or a combination of these properties. If the run-time environment implements a generational garbage collector, the reference tags are used to encode whether or not the object is recently allocated.

32 Claims, 3 Drawing Sheets

MEMORY MANAGEMENT WITHIN A RUN-TIME ENVIRONMENT

RELATED APPLICATIONS

The present application is related to the following applications:

The present application is a divisional of U.S. patent application Ser. No. 09/248,295 filed on Feb. 11, 1999, the contents of which are hereby incorporated by reference.

U.S. patent application Ser. No. 09/248,291, entitled "A Machine Independent Memory Management System Within a Run-Time Environment," filed on Feb. 11, 1999 by Harlan Sexton et al., the contents of which are hereby incorporated by reference.

U.S. patent application Ser. No. 09/248,294, entitled "Address Calculation of Invariant References Within a Run-Time Environment," filed on Feb. 11, 1999 by Harlan Sexton et al., the contents of which are hereby incorporated by reference.

U.S. patent application Ser. No. 09/248,297, entitled "A Page Memory Management System Within a Run-Time Environment," filed on Feb. 11, 1999 by Harlan Sexton et al., the contents of which are hereby incorporated by reference.

FIELD OF THE INVENTION

The present invention relates to computer system and more particularly to managing memory for a runtime execution environment.

BACKGROUND OF THE INVENTION

In a dynamic run-time environment for a language such as JAVA™, memory management for objects is very important. In specific, a dynamic run-time environment has to handle the allocation and deallocation of memory for objects. An object is an entity that encapsulates data and, in some environments such as JAVA, operations associated with the object.

When an object is created, a certain amount of memory must be allocated for the object. When the object is no longer needed, the memory for the object needs to be deallocated so that it can be reused for other purposes. Memory deallocation can be manual, as in the C programming languages, or handled automatically by a "garbage collector." There are various types of garbage collectors. For example, a generational garbage collector distinguishes objects based on their lifetime because a recently-allocated object is usually a short-lived object. In one implementation of a generational garbage collector, objects are stored in one of at least two memory areas, referred to as "oldspace" and "newspace." When an object is first created, memory for the object is allocated out the newspace. After the object has lasted for a period time, such as four scavenges of newspace, it is "tenured" and migrated into the oldspace.

Use of different memory areas for objects, where the different areas are distinguished by the lifetime of the objects contained therein, allows the generational garbage collector to employ different allocation and garbage collection strategies for the memory areas. For example, since newspace tends to hold many objects that are frequently allocated and abandoned, memory allocation within newspace is preferably implemented by a cheap technique such as "frontier consing" (incrementing a pointer to the beginning of free storage) and garbage collection by a copying garbage collector. On the other hand, since oldspace tends to hold fewer and longer-lived objects, it may be preferable to perform memory allocation a buddy or best fit allocation technique, and deallocation by a mark-sweep garbage collector.

The performance of a generational garbage collector is greatly affected by the efficiency of calculating a "root set" for all the objects in newspace. A root set for newspace is a set of objects such that the transitive closure of the set contains all the live objects in newspace. In specific, it is important to determine all the oldspace objects that reference objects in newspace. One method of simplifying the root set calculation is to maintain a "remember table," which is a data structure used by the garbage collector to record which objects in newspace are referenced by an object in oldspace. The remember table is updated when an assignment operation might places a reference to a newspace object in an oldspace object. The check that occurs to determine whether an assignment operation places a reference to a newspace object in an oldspace object is referred to as a "write barrier". It is desirable to detect such assignments in an efficient manner.

One approach to detecting the assignment of a reference to a newspace object in an oldspace object is to reserve a respective, contiguous range of memory locations for newspace and oldspace, and to examine the location of the objects with respect to the reserved ranges. For example, if newspace objects are always allocated in the contiguous range 012,000,000–012,777,777 (octal) and oldspace objects are always allocated in the contiguous range 023,450,000–023,517,730, then an occurrence of storing of a newspace reference into an oldspace object can be identified simply by comparing the location of the objects within the reserved ranges. Thus, a reference to one object at location 012,345,670 is determined to be in newspace because the location 012,345,670 falls within the range 012,000,000–012,777,777.

Many run-time environments, however, are implemented in an environment that does not allow for large contiguous memory areas to be allocated. In such environments, memory can only be obtained as a plurality of usually segments. As a result, determining which memory area the object is located in cannot merely be determined by examining the location of the object.

One approach to determining to which memory area an object belongs involves traversing an ancillary data structure that lists which segments are allocated to which memory area. However, this approach incurs many expensive pointer dereferences for the ancillary data structure. Another approach involves storing a header at the beginning of every object that describes the space within which the object is located. Accessing the information stored in the object header, however, requires dereferencing a memory pointer to the object, which is expensive due to holes in the instruction pipeline, cache misses, or even a page fault if the page upon which the object header is located has been swapped out by the virtual memory system.

Therefore, a need exists for a run-time environment to manage storage properties for objects, such as properties that indicate within which memory area an object is allocated. There also exists a need for efficiently determining a storage property for an object, preferably without having to dereference a memory pointer. Furthermore, there is a need for an efficient way to detect an assignment of a reference to a newspace object within an oldspace object.

SUMMARY OF THE INVENTION

These and other needs are addressed by encoding storage properties about an object within some of the least significant bits, called a "tag," of a reference to the object, such as a machine pointer. Therefore, the storage properties can be efficiently determined simply by extracting and examining the specified bits of the tag without having to dereference the machine pointer. The storage properties of an object that can be encoded in the tag of a reference to the object generally indicate how and when the object is stored in memory managed by a run-time environment. For example, the tag can encode information about the lifetime, format, and/or contiguity of an object; thus, the tag can indicate whether the object is allocated in newspace or in oldspace.

Accordingly, one aspect of the invention relates to a computer-implemented method and computer-readable medium bearing instructions for managing information about a storage property for an object. The object is stored in a memory, for example at an N-bit aligned address, and a reference to the object is created by storing, in an base address portion of the reference, a location of the object within the memory. The methodology includes storing, in a tag portion of the reference, the information about the storage property for the object. The tag portion of the reference includes one or more bits of the reference that are less significant than bits for the address portion. In one embodiment, information about the storage property for the object is retrieved by accessing the tag portion of the reference to the object.

Another aspect of the invention pertains to a computer-implemented method and computer-readable medium bearing instructions for managing memory for a plurality of objects. The methodology includes allocating the objects in a first memory area and migrating some of the objects from the first memory area to a second memory area based on their lifetimes. Either the first memory area or the second memory area or both include a plurality of noncontiguous segments. A data structure of information about which second objects in the second memory area reference first objects in the first memory area is maintained by determining whether a first object is allocated in the first memory area and a second object is allocated in the second memory area based on a first reference to a first object and a second reference to a second object, without dereferencing a memory pointer. In one embodiment, determining the first object is allocated in the first memory area and the second object is allocated in the second memory area is performed by extracting the tags of the references to the first and second objects and comparing the tags.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and apparatus for managing memory are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
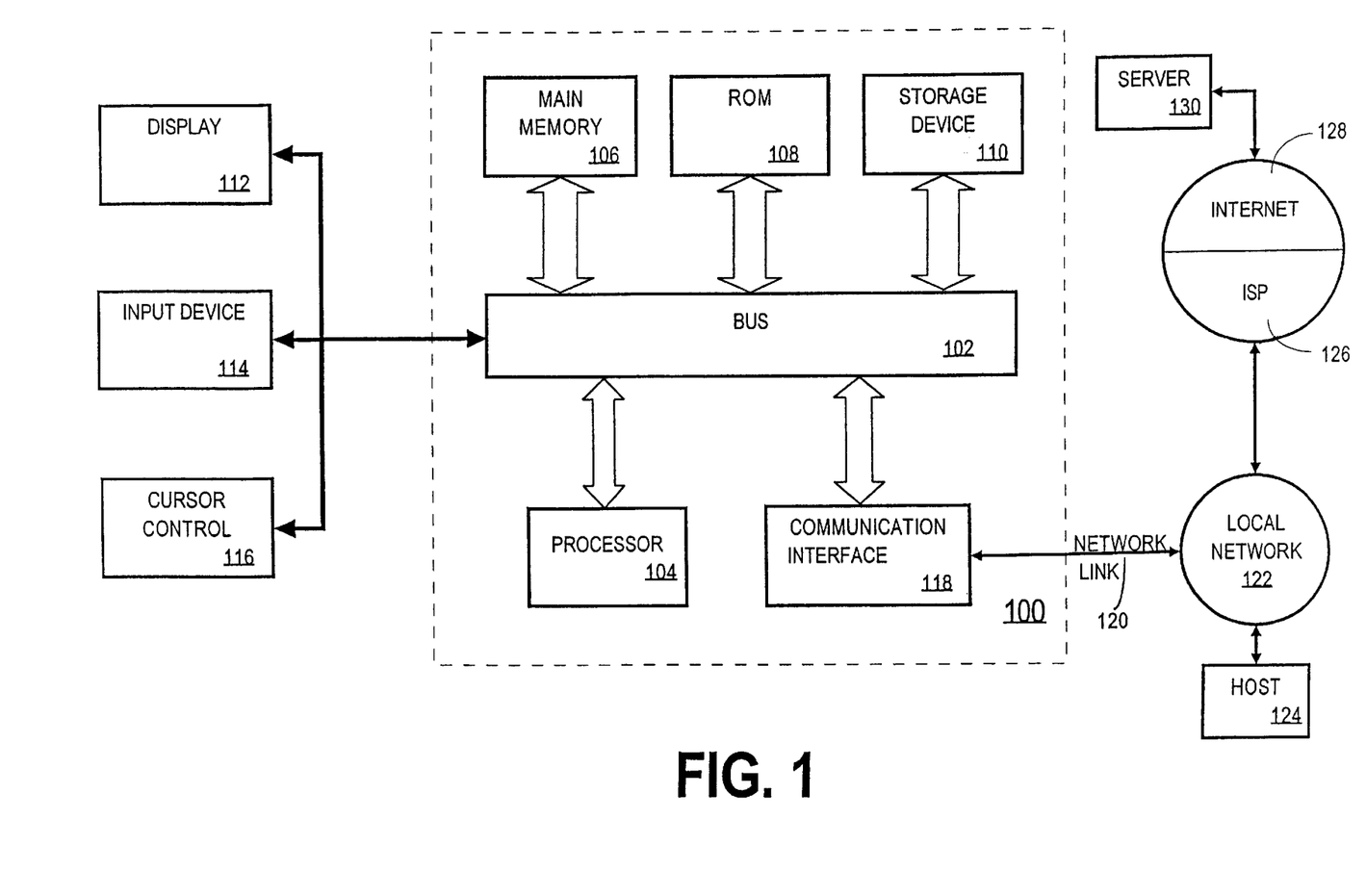
FIG. 1 is a block diagram depicting a computer system that can be used to implement an embodiment.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for memory management of objects. According to one embodiment of the invention, managing memory is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for managing memory as described herein.

The received code may be executed by processor 104 as it is received, and/or stored in storage device 110, or other non-volatile storage for later execution. In this manner, computer system 100 may obtain application code in the form of a carrier wave.

Reference Tagging

The present invention stems from the realization that an alignment invariant can be introduced and then exploited in a dynamic run-time environment for a strongly typed language such as JAVA™ to encode information about storage properties of the object within all references to the object. One example of a reference is a machine pointer, which contains a location of the object in the form of a real or virtual address in the memory space of the computer system. The information embedded within the pointer, which is likely to be sitting in a fast-access machine register, can therefore be retrieved very quickly, without requiring additional memory cycles to fetch the header of the referenced object.

Figure 2:
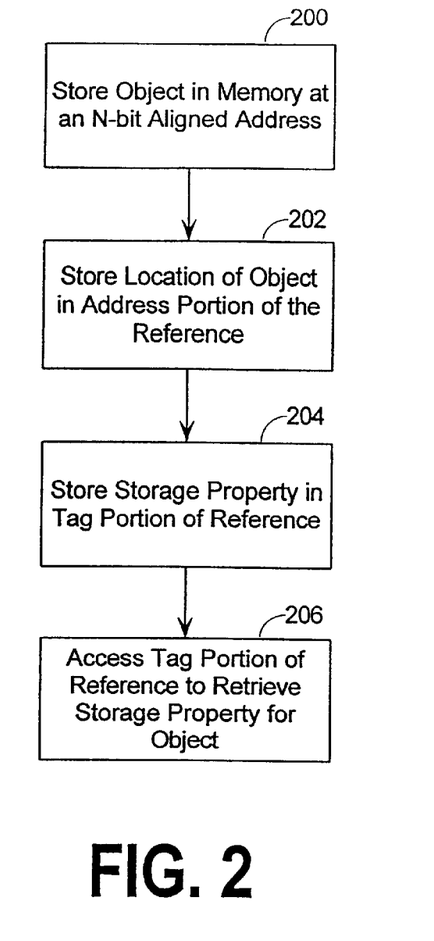
FIG. 2 is a flowchart describing steps for creating and using a tagged pointer.

Referring to FIG. 2, objects managed by the run-time environment are stored at an N-bit aligned address (step 200). In other words, the storage for these objects begins at virtual addresses that begin on $2^N$-byte boundaries. For example, the objects can be stored at three-bit aligned addresses, that is, on $2^3=8$ byte boundaries. Thus, a legal start address, expressed as an octal number, for such an object might be 02,447,630, but an address such as 02,447,634 is not a valid start address for the storage of an object. Consequently, the three least significant bits of the pointer do not serve to discriminate different objects, since only one of the eight values for the three least significant bits is a legal address and the remaining seven values do not point to any other object. Given this alignment restriction, machine pointers with addresses of 02,447,630 through 02,447,637 effectively refer to the same object.

Therefore, any of the N least significant bits of a pointer to an N-bit aligned object can be used to encode other information, namely storage properties, of the referenced object. The remaining portion of the pointer, called the "base address," contains the location of the object within the virtual memory. Consequently, any of the bits in a pointer that are less significant than the bits for the base address are available for indicating a storage property of the object. For example, all three bits of a pointer to a 3-bit aligned object can be used to indicate a storage property of the object. As another example, bits 2 and 3 can be dedicated to indicating a storage property of the object, but bit 0 can be used for some other kind of instance property.

Figure 3:
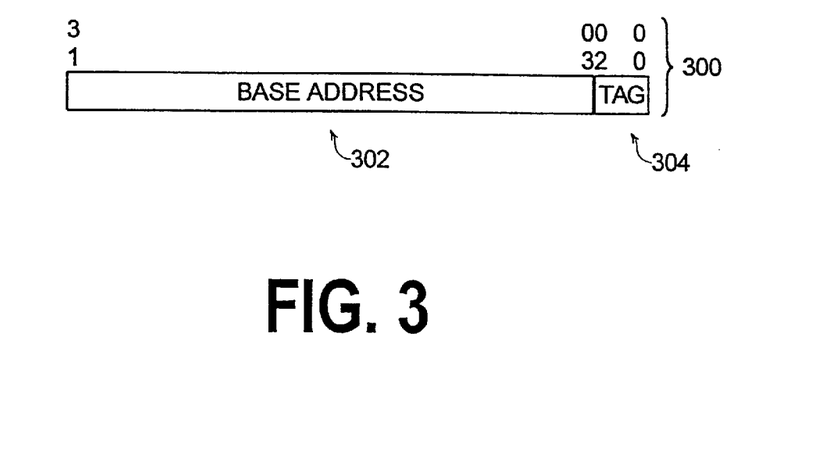
FIG. 3 schematically illustrates one implementation of a tagged pointer.

In one implementation illustrated in FIG. 3, pointer 300 consists of a 32-bit virtual address. If objects within the run-time environment are aligned on 8-byte boundaries, then three least significant bits of pointer 300 are available for tag 304, and the remaining 29 bits, constituting base address portion 302, are used to hold the location of the referenced object. Although FIG. 3 depicts one example of a 32-bit pointer 300 with a 3-bit tag 304, the present invention is not limited to these particular sizes, and the pointer size and tag size may vary from implementation to implementation. For example, pointer tagging is appropriate for 16-bit, 36-bit, and 64-bit pointers, and 1-bit through 5-bit tags.

Referring back to FIG. 2, when a reference such as a pointer to an object is created, the location of the object is stored in the base address portion of the reference (step 202), and the desired storage property of the referenced object is stored in the tag portion (step 204). To retrieve the storage property for an object based on a pointer 300 referencing the object, the tag portion 304 of the pointer 300 is accessed (step 306) without dereferencing the pointer. The tag can be extracted in a variety of ways, for example, by masking the pointer to extract the least significant bits 304 or by calculating a pointer difference of the pointer 300 and the actual start address of the object.

To deference a tagged pointer, the base address is extracted from the pointer and then dereferenced. For example, a tagged pointer 02,447,634 is converted to the base address 02,447,630 for dereferencing. The base address can be extracted, for example, by masking off the tag. In the C programming language the tag can be masked off with the following expression: (ptr & ~07).

Storage Properties

In contrast with some Smalltalk™ and LISP Machine™ implementations that encode type information in a pointer tag, one embodiment of the invention employs referencing tagging in a dynamic run-time environment for a strongly typed language such as JAVA™ to encode non-type information about storage properties of an object. In a run-time environment for a strongly typed language, storing type information in a pointer is unnecessary because the compiler is already aware of the relevant type information generally in those contexts, e.g. message dispatching, in which knowing the type of an object is critical.

A storage property is a stable instance property, other than "type", that generally pertains to how the object is stored in memory and how long the object is stored in memory managed by a run-time environment. It has been found to be particularly useful to encode within a pointer tag three kinds of storage properties: lifetime, format, and contiguity. In addition, combinations of these storage properties can be encoded in the pointer tag.

The lifetime storage property of an object indicates how long the object has been in existence. The lifetime can be expressed absolutely in terms of time or in relative terms to another object or to an event. For example, "recently" allocated objects can be tagged with a 0 and "older" objects can be tagged with a 1. More precisely in a generational garbage collector, the tag 0 is associated with objects in newspace, and the tag 1 is associated with objects in oldspace. In this case, an older object can be defined as surviving four occurrences in which newspace was scavenged for garbage collection. As another example, the lifetime can indicate whether the object was allocated during the current SQL call, in a previous call in the session, or has remained persistent between sessions.

The format of an object indicates what the internal representation of the object is. Format differs from type, in that type is a logical concept while format is a physical concept. Accordingly, it is possible for two objects of the same type to have different formats or internal representations. One example of a format for an object involves the internal representation of a reference to another object. This reference can be implemented in one format as a native machine pointer and as a numeric reference in another format. A numerical reference is a integer that describes the location of an object as a displacement or offset from an implicit base pointer, such as the space of an allocation area of memory or even the start of the object itself. Since the internal representation of a numerical reference is an integer, a numeric reference is more portable and potentially more relocatable than native machine pointers. In fact, numeric references themselves can be tagged to record storage properties, such as contiguity, of the objects the numeric references refer to.

Another storage property is the contiguity of the object, indicating whether the object is stored at contiguous memory locations or on noncontiguous pages. This storage property has been found to be particularly advantageous in run-time environments in which memory can only be obtained as a plurality of usually noncontiguous pages. A page is a fixed-length contiguous region of the (virtual) address space of a computer system. In one embodiment, the page size is 4096 ($2^{12}$), although the page size can range in other embodiments, such as from $2^8$ (256) to $2^{16}$ (65536) bytes. An object is said to be noncontiguous or "paged," if it is stored on a plurality of pages, especially if one of the pages is not contiguous to any other of the pages. Address calculation of a field, instance variable, or "slot" of a paged object is quite involved, by indexing though a page table, but much simpler for contiguous objects. Therefore, encoding the contiguity of an object in a reference tag enables the appropriate machine instructions to be dispatched for accessing the slots of the paged object.

The tag can also encode combinations of storage properties, such as the lifetime and format of the object (for one format) or the contiguity and format of the object (for another format). TABLE 1 lists one possible assignment of tag values for such properties:

TABLE 1

| TAG | PROPERTY |
| --- | --- |
| 0 | Pointer format, newspace lifetime |
| 1 | Pointer format, oldspace lifetime |
| 2 | Numeric reference format, contiguous |
| 3 | n/a |
| 4 | n/a |
| 5 | n/a |
| 6 | Numeric reference format, paged |
| 7 | n/a |

Since the storage property of the object is encoded in all the references to the object, it follows that changes made to the storage property of the object must be reflected in all the references to the object. However, this restriction is not problematic for tagging storage properties. For example, some properties are essentially permanent, such as format or contiguity, and alteration of such pointer tags will rarely, if ever, occur. As another example, when a newspace object is tenured into oldspace by a generational scavenger, all references to that object must necessarily be relocated by the scavenger in any case, and, as part of this relocation, the tag can be updated, even though lifetime is not a permanent property of the object.

Using Pointer Tags to Implement a Write-Barrier

Figure 4:
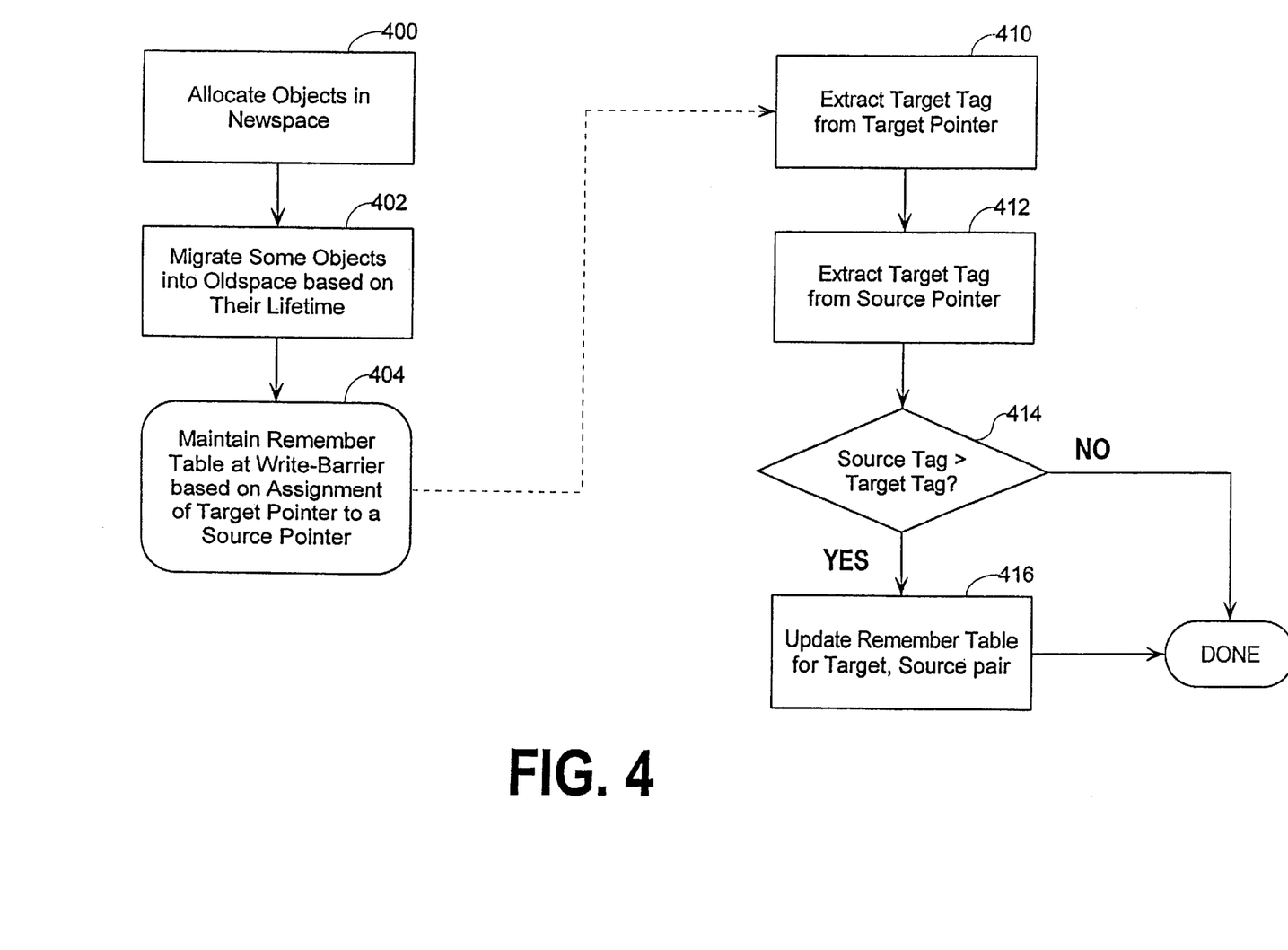
FIG. 4 is a flowchart describing steps for maintaining a remember table at a write-barrier.

FIG. 4 depicts a flowchart illustrating how pointer tags can be used to efficiently implement a write barrier in a generational garbage collector. Within the generational garbage collector, objects are allocated in newspace (step 400) and some of the objects are migrated into oldspace based on their lifetime (step 402). A data structure called a remember table is maintained at a write barrier. That is, in response to an assignment of a target pointer to a target object into a field in source object referenced by source pointer, a remember table is conditionally updated (step 404). More specifically, the remember table is to updated if it is determined that the target object is in newspace and the source object is in oldspace.

Steps 410–416 describe how this determination is performed using pointer tags according to one embodiment. At step 410, the target tag is extracted from the target pointer, as by masking or computing a pointer difference, and at step 412, the source tag is extracted from the source pointer. These operations are typically register-to-register operations for most computer architectures and do not involve dereferencing a memory pointer. Consequently, the overhead typically associated with dereferencing a memory pointer, such as issuing a memory read cycle on a system bus or performing a memory fetch, is avoided. Therefore, pointer tags serve to avoid the expense of conventional approaches, which may incur a cache miss or even a virtual memory page fault. In particular, using only register operations results in a significant performance improvement over the conventional object header approach.

At step 414, the source tag and the destination tag are checked to determine whether the assignment statement results in an oldspace source object referencing a newspace target object. If this check is true, the remember table is updated (step 416). In one embodiment, this checking operation can be performed simply by comparing the source tag to the oldspace value and comparing the target tag to the newspace value. For example, in the C programming language, the following expression can perform this check: ((source & 07) == OLDSPACE && (target & 07) == NEWSPACE), where source is the pointer to the source object, target is the pointer to the target object, OLDSPACE and NEWSPACE are manifest constants defined to prescribed values, e.g. 1 and 0 respectively.

While the above-described expression is capable of performing the check, it can be made more efficient with appropriate choices of tag values. For example, with an oldspace tag of 1 and a newspace value of 0, this determination can be simply made by a comparison for inequality: (source & 07) > (target & 07). With additional tag values, this comparison can still used in a generational garbage collector, if, for example, all the write operations involving assignments into pointer format objects are segregated from those involving write operations into numeric reference format objects. This situation may occur if the generational garbage collector is only used for pointer formatted objects in call-duration memory, and the numeric reference formatted objects are allocated in a session-duration memory.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method of managing information about a storage property for an object, comprising the computer-implemented steps of:

creating a reference to the object by storing, in an base address portion of the reference, a location of the object within the memory; and storing, in a tag portion of the reference, the information about the storage property for the object, wherein the tag portion of the reference includes one or more bits of the reference that are less significant than bits for the address portion.

2. The method of claim 1, wherein the step of storing the object in a memory includes the step of storing the object in a memory at an N-bit aligned address.

3. The method of claim 2, wherein the tag portion includes the N least significant bits of the reference.

4. The method of claim 2, further comprising the step of retrieving the information about the storage property for the object by accessing the tag portion of the reference to the object.

5. The method of claim 2, wherein the step of storing, in a tag portion of the reference, the information about the storage property for the object includes the step of storing, in the tag portion, information about a lifetime of the object.

6. The method of claim 2, wherein the step of storing, in the tag portion, information about a lifetime of the object includes the step of storing, in the tag portion, information indicating whether the object has existed for at least a prescribed number of garbage collection events.

7. The method of claim 2, wherein the step of storing, in a tag portion of the reference, the information about the storage property for the object includes the step of storing, in the tag portion, information about a storage format of the object.

8. The method of claim 7, wherein:

the object contains a reference; and the step of storing, in the tag portion, information about a storage format of the object includes the step of storing, in the tag portion, information about a format of the reference contained within the object.

9. The method of claim 8, wherein the step of storing, in the tag portion, information about a format of the reference contained within the object includes the step of storing, in the tag portion, information indicating whether the reference contained therein is stored as a machine pointers or as a numeric reference.

10. The method of claim 2, wherein the step of storing, in a tag portion of the reference, the information about the storage property for the object includes the step of storing, in the tag portion, information about the contiguity of the object.

11. The method of claim 10, wherein the step of storing, in the tag portion, information about the contiguity of the object includes the step of storing, in the tag portion, information indicating whether the object is stored in a plurality of pages.

12. The method of claim 11, wherein the step of storing, in the tag portion, information indicating whether the object is stored in a plurality of pages includes the step of storing, in the tag portion, information indicating whether the object is stored in at least one page that is not contiguous to any other of the pages.

13. The method of claim 2, wherein the step of storing, in a tag portion of the reference, the information about the storage property for the object includes the step of storing, in the tag portion, either of (a) information indicating both a lifetime of the object and that a references contained in the object is stored in a first format and (b) information indicating both a contiguity of the object and that the reference contained in the object is stored in a second format other than the first format.

14. The method of claim 1, wherein N is exactly three.

15. The method of claim 1, wherein the step of creating a reference includes the step of initializing a machine pointer.

16. The method of claim 1, wherein the step of creating a reference includes the step of initializing a numeric reference.

17. A computer-readable medium bearing instructions for managing information about a storage property for an object, said instructions arranged, when executed, to cause one or more processors to perform the steps of:

storing the object in a memory;

creating a reference to the object by storing, in an base address portion of the reference, a location of the object within the memory; and storing, in a tag portion of the reference, the information about the storage property for the object, wherein the tag portion of the reference includes one or more bits of the reference that are less significant than bits for the address portion.

18. The computer-readable medium of claim 17, wherein the step of storing the object in a memory includes the step of storing the object in a memory at an N-bit aligned address.

19. The computer-readable medium of claim 18, wherein the tag portion includes the N least significant bits of the reference.

20. The computer-readable medium of claim 18, wherein the instructions are further arranged, when executed, to cause the one or more processors to perform the step of retrieving the information about the storage property for the object by accessing the tag portion of the reference to the object.

21. The computer-readable medium of claim 18, wherein the step of storing, in a tag portion of the reference, the information about the storage property for the object includes the step of storing, in the tag portion, information about a lifetime of the object.

22. The computer-readable medium of claim 18, wherein the step of storing, in the tag portion, information about a lifetime of the object includes the step of storing, in the tag portion, information indicating whether the object has existed for at least a prescribed number of garbage collection events.

23. The computer-readable medium of claim 18, wherein the step of storing, in a tag portion of the reference, the information about the storage property for the object includes the step of storing, in the tag portion, information about a storage format of the object.

24. The computer-readable medium of claim 23, wherein:

the object contains a reference; and the step of storing, in the tag portion, information about a storage format of the object includes the step of storing, in the tag portion, information about a format of the reference contained within the object.

25. The computer-readable medium of claim 24, wherein the step of storing, in the tag portion, information about a format of the reference contained within the object includes the step of storing, in the tag portion, information indicating whether the reference contained therein is stored as a machine pointers or as a numeric reference.

26. The computer-readable medium of claim 18, wherein the step of storing, in a tag portion of the reference, the information about the storage property for the object includes the step of storing, in the tag portion, information about the contiguity of the object.

27. The computer-readable medium of claim 26, wherein the step of storing, in the tag portion, information about the contiguity of the object includes the step of storing, in the tag portion, information indicating whether the object is stored in a plurality of pages.

28. The computer-readable medium of claim 27, wherein the step of storing, in the tag portion, information indicating whether the object is stored in a plurality of pages includes the step of storing, in the tag portion, information indicating whether the object is stored in at least one page that is not contiguous to any other of the pages.

29. The computer-readable medium of claim 18, wherein the step of storing, in a tag portion of the reference, the information about the storage property for the object includes the step of storing, in the tag portion, either of (a) information indicating both a lifetime of the object and that a references contained in the object is stored in a first format and (b) information indicating both a contiguity of the object and that the reference contained in the object is stored in a second format other than the first format.

30. The computer-readable medium of claim 17, wherein N is exactly three.

31. The computer-readable medium of claim 17, wherein the step of creating a reference includes the step of initializing a machine pointer.

32. The computer-readable medium of claim 17, wherein the step of creating a reference includes the step of initializing a numeric reference.

* * * * *

UNITED STATES PATENT AND TRADEMARK OFFICE
CERTIFICATE OF CORRECTION

PATENT NO.    : 6,678,697 B2
DATED         : January 13, 2004
INVENTOR(S)   : Sexton et al.

It is certified that error appears in the above-identified patent and that said Letters Patent is hereby corrected as shown below:

<u>Title page,</u>
Item [56], References Cited, U.S. PATENT DOCUMENTS, add the following:
```
-- 6,009,266   12/1999     Brownell et al.
   6,154,823   11/2000     Benayon et al.
   6,128,621   10/2000     Weisz
   6,105,041   08/2000     Bennett et al.
   5,805,896   09/1998     Burgess
   5,794,256   08/1998     Bennett et al.
   5,426,747   06/1995     Weinreb et al.
   5,903,899   05/1999     Steele Jr.
   5,903,900   05/1999     Knipple et al. --
```
FOREIGN PATENT DOCUMENTS, add the following:
```
-- EP   0 967 546    A2    12/1999
   EP   0 700 000    A2    03/1996
   EP   0 874 309    A2    10/1998 --
```

OTHER PUBLICATIONS, add the following:
-- Bruce Millard et al., "Run-Time Support and Storage Management for Memory-Mapped Persistent Objects" 12/1993, IEEE Pointer Swizzling at Page Fault Time: Efficiently Supporting Huge Address Spaces on Standard Hardware-June 1991 No. 4 - pages 6-13

Working with Persistant Objects: to Swizzle or Not to Swizzle – pages 657-673

XP-002141155 - Generational Garbage Collection pages 143-163

XP-002141152 - Introduction pages 1-38

XP-002141153 - A Real Time Garbage Collector Based on Lifetimes of Objects – Volume 26 Number 6
XP-002141154 – Oracle8i Java Developer's Guide – Pages 1-17

UNITED STATES PATENT AND TRADEMARK OFFICE
CERTIFICATE OF CORRECTION

PATENT NO. : 6,678,697 B2
DATED : January 13, 2004
INVENTOR(S) : Sexton et al.

It is certified that error appears in the above-identified patent and that said Letters Patent is hereby corrected as shown below:

Title page, (cont.)
www.ddj.com/articles/1998/9810/9810a/9810a.htm, Alexandre Petit-Bianco, "Java Garbage Collection for Real-Time Systems" --

Signed and Sealed this

Nineteenth Day of July, 2005

JON W. DUDAS
*Director of the United States Patent and Trademark Office*